(12) United States Patent
Katayama et al.

(10) Patent No.: US 12,142,780 B2
(45) Date of Patent: Nov. 12, 2024

(54) EQUIPMENT COMPONENT FIXATION STRUCTURE

(71) Applicant: TOYOTA JIDOSHA KABUSHIKI KAISHA, Toyota (JP)

(72) Inventors: Junta Katayama, Miyoshi (JP); Shungo Iizuka, Toyota (JP); Isao Takahashi, Toyota (JP); Hikaru Hishida, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 200 days.

(21) Appl. No.: 17/518,851

(22) Filed: Nov. 4, 2021

(65) Prior Publication Data

US 2022/0190427 A1    Jun. 16, 2022

(30) Foreign Application Priority Data

Dec. 16, 2020   (JP) .................................. 2020-208341

(51) Int. Cl.
  *H01M 50/249*   (2021.01)
  *H02G 3/08*   (2006.01)

(52) U.S. Cl.
  CPC ...... *H01M 50/249* (2021.01); *H01M 2220/20* (2013.01); *H02G 3/08* (2013.01)

(58) Field of Classification Search
  CPC ............. H01M 50/249; H01M 50/244; H01M 50/242; H01M 2220/20; H02G 3/08
  See application file for complete search history.

(56) References Cited

U.S. PATENT DOCUMENTS

| 2002/0180272 | A1* | 12/2002 | Yuasa | B60R 16/0238 |
| | | | | 307/10.1 |
| 2006/0096797 | A1* | 5/2006 | Tsuchiya | H01M 10/613 |
| | | | | 180/68.5 |
| 2012/0244403 | A1* | 9/2012 | Maskew | B60L 50/16 |
| | | | | 429/99 |
| 2013/0273755 | A1* | 10/2013 | Yokoyama | H01M 10/425 |
| | | | | 439/76.2 |
| 2015/0258913 | A1* | 9/2015 | Kobayashi | B60L 58/20 |
| | | | | 180/65.21 |

FOREIGN PATENT DOCUMENTS

| CN | 104736365 A | 6/2015 | |
| JP | 2002369336 A | * 12/2002 | ......... B60R 16/0238 |
| JP | 2004-040879 A | 2/2004 | |
| JP | 2013-218957 A | 10/2013 | |
| KR | 20180063873 A | * 6/2018 | |

OTHER PUBLICATIONS

Enlgish translation of Choi et al. (KR-20180063873-A). (Year: 2018).*
English translation of Yuasa et al. (JP-2002369336-A). (Year: 2002).*
English translation of Yamaguchi et al. (JP-2004040879-A). (Year: 2004).*

* cited by examiner

*Primary Examiner* — Haroon S. Sheikh
*Assistant Examiner* — Drew C Newman
(74) *Attorney, Agent, or Firm* — Sughrue Mion, PLLC

(57) ABSTRACT

An equipment component fixation structure includes: a cell stack; an equipment case; an equipment component; an in-vehicle bracket; and a support bracket supporting the equipment case. The in-vehicle bracket has a shape as extending from the cell stack to below the equipment case. The support bracket couples the in-vehicle bracket and the equipment case.

1 Claim, 3 Drawing Sheets

EQUIPMENT COMPONENT FIXATION STRUCTURE

This nonprovisional application is based on Japanese Patent Application No. 2020-208341 filed on Dec. 16, 2020 with the Japan Patent Office, the entire content of which is hereby incorporated by reference.

BACKGROUND

Field

The present disclosure relates to an equipment component fixation structure.

Description of the Background Art

For example, Japanese Patent Laying-Open No. 2004-40879 discloses a structure for mounting an electrical junction box onto a battery storage box housing a battery. Guide members and projections are provided on the surrounding wall of the battery storage box. The electrical junction box is held by the battery storage box by engaging with the guide members and the projections.

SUMMARY

With such a structure for mounting the electrical junction box as disclosed in Japanese Patent Laying-Open No. 2004-40879, as the electrical junction box resonates to the vibration of a vehicle, etc., the equipment component of the electrical junction box may vibrate.

An object of the present disclosure is to provide an equipment component fixation structure which can reduce the vibration of the equipment component.

An equipment component fixation structure according to one aspect of the present disclosure includes: a cell stack having a side portion; an equipment case which is secured to the side portion of the cell stack and capable of holding an equipment component; an equipment component held in the equipment case; an in-vehicle bracket for mounting the cell stack onto a vehicle, the in-vehicle bracket being secured to the cell stack; and a support bracket for supporting the equipment case, wherein the in-vehicle bracket has a shape as projecting from the cell stack to below the equipment case, and the support bracket couples the in-vehicle bracket and the equipment case.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
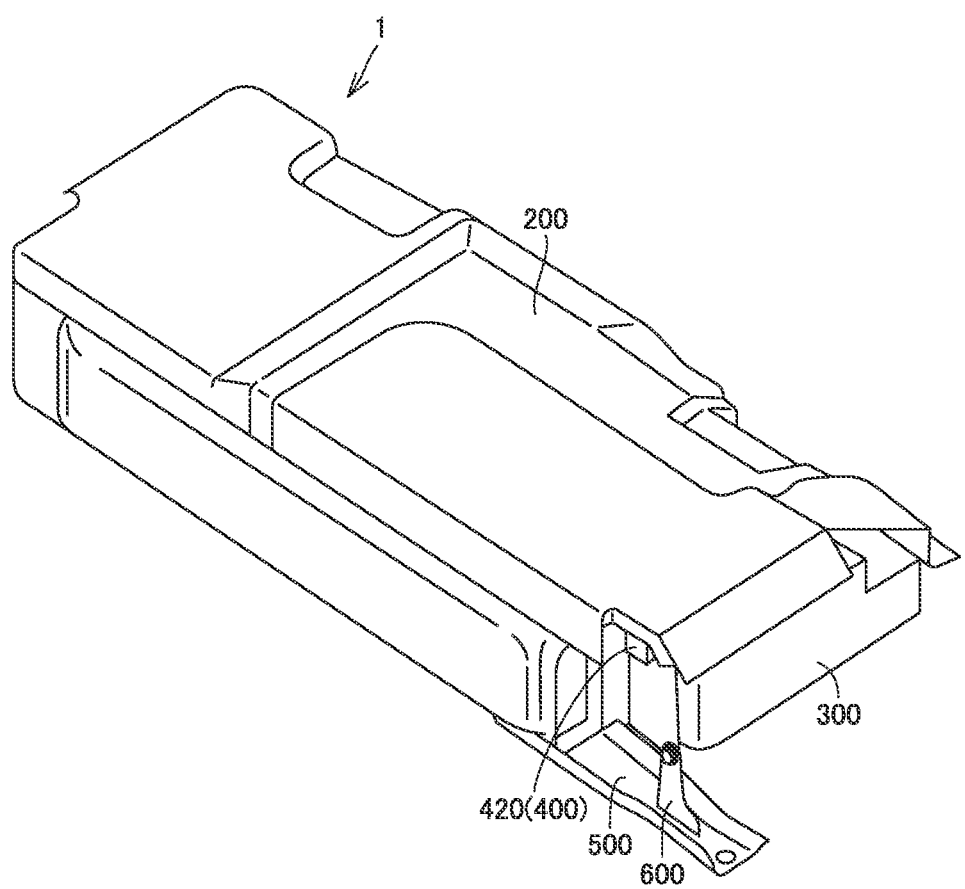
FIG. 1 is a perspective view schematically showing a battery pack which includes an equipment component fixation structure according to one embodiment of the present disclosure.

An embodiment according to the present disclosure will be described, with reference to the accompanying drawings.

Referring now to the drawings wherein like numerals are used to refer to the same or corresponding members.

Figure 2:
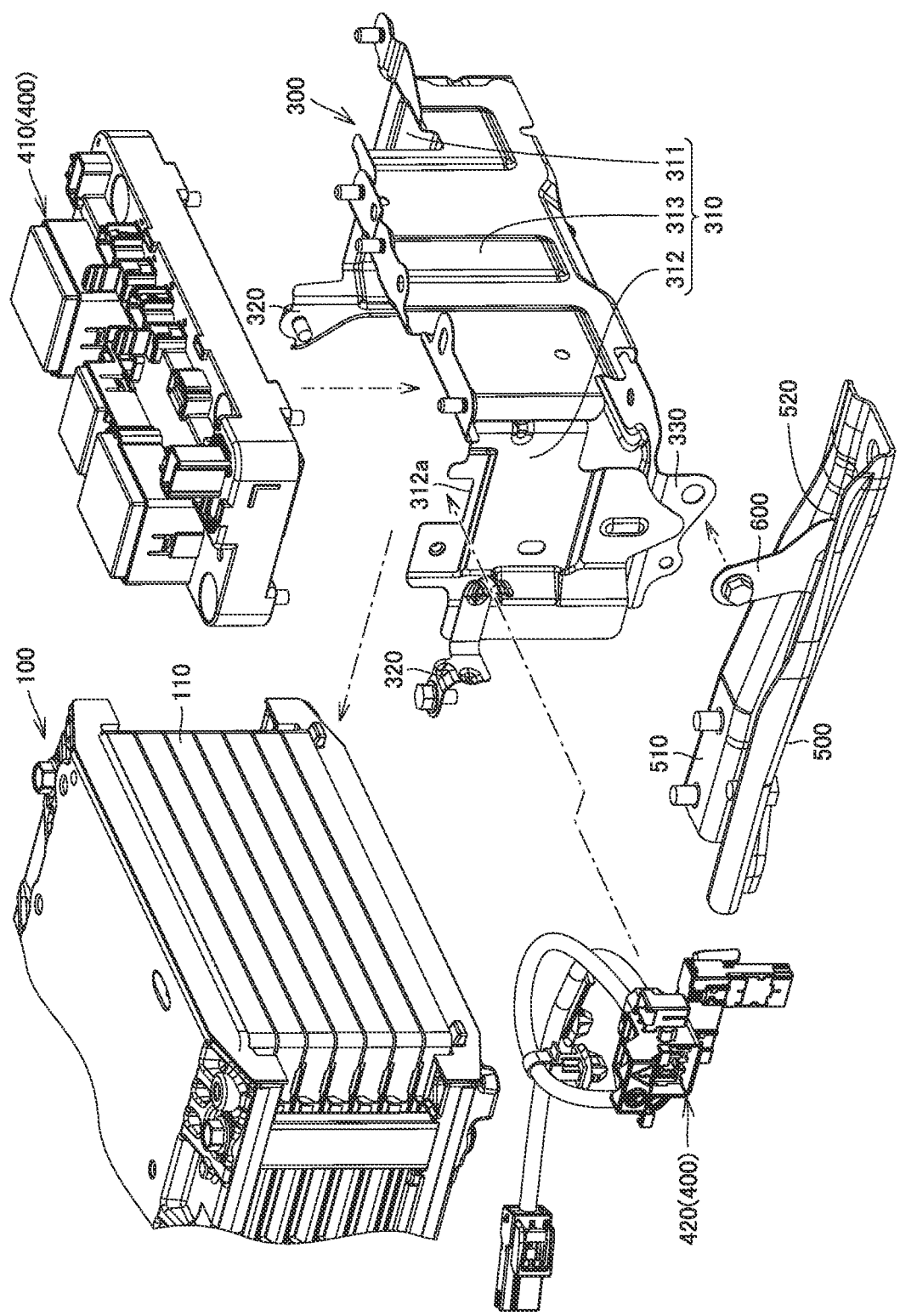
FIG. 2 is a partially exploded perspective view of the equipment component fixation structure.
Figure 3:
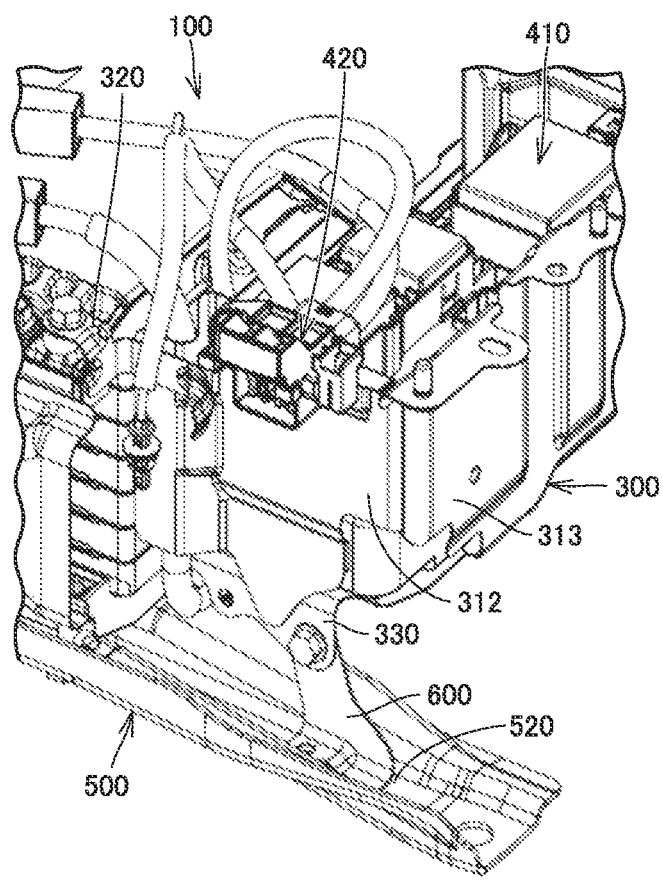
FIG. 3 is an enlarged view of the equipment component fixation structure.

FIG. 1 is a perspective view schematically showing a battery pack which includes an equipment component fixation structure according to one embodiment of the present disclosure. A battery pack 1 is mounted on a vehicle, for example. FIG. 2 is a partially exploded perspective view of the equipment component fixation structure. FIG. 3 is an enlarged view of the equipment component fixation structure.

As shown in FIGS. 1 to 3, the battery pack 1 includes a cell stack 100, a cover 200, and an equipment case 300, an equipment component 400, an in-vehicle bracket 500, and a support bracket 600.

The cell stack 100 includes multiple secondary batteries arranged in one direction. Examples of the secondary battery include a lithium-ion battery. The cell stack 100 has a generally parallelepiped shape. As shown in FIG. 2, the cell stack 100 has a side portion 110.

As shown in FIG. 1, the cover 200 covers the cell stack 100. The cover 200 is formed of a metal plate, for example.

The equipment component 400 is held in the equipment case 300. The equipment component 400 includes a junction box 410 and a service plug 420. Wiring harnesses and connectors are connected to the service plug 420.

The equipment case 300 is secured to the side portion 110 of the cell stack 100. The equipment case 300 holds the equipment component 400. The equipment case 300 has an enclosing portion 310, mounting portions 320, and a mounting piece 330.

The enclosing portion 310 encloses the junction box 410. The enclosing portion 310 has a first wall 311, a second wall 312, and a third wall 313.

The first wall 311 has a shape as protruding from one end of the side portion 110 of the cell stack 100. The first wall 311 is formed in a plate shape.

The second wall 312 has a shape as protruding from the other end of the side portion 110 of the cell stack 100. The second wall 312 is formed in a plate shape. The second wall 312 and the first wall 311 are opposing walls.

The second wall 312 has a holding portion 312a. The holding portion 312a holds a portion of the equipment component 400. Specifically, the holding portion 312a holds the service plug 420. As shown in FIG. 2, the holding portion 312a is configured of a recess formed at the top end portion of the second wall 312.

The third wall 313 couples the first wall 311 and the second wall 312. The third wall 313 is opposite the side portion 110 of the cell stack 100.

The mounting portions 320 are connected to the enclosing portion 310. More specifically, the mounting portions 320 are connected to the top portion of the first wall 311 and the top portion of the second wall 312. The mounting portions 320 are mounted on the side portion 110 of the cell stack 100.

The mounting piece 330 is connected to the enclosing portion 310. In the present embodiment, the mounting piece 330 is connected to the bottom end of the second wall 312. The mounting piece 330 is formed vertically below the holding portion 312a.

The in-vehicle bracket 500 is for mounting the cell stack 100 onto a vehicle. The in-vehicle bracket 500 is secured to the bottom portion of the cell stack 100. The in-vehicle bracket 500 has a shape as extending from the cell stack 100 to below the equipment case 300. The in-vehicle bracket 500 has a connection 510 and a fixation portion 520.

The connection 510 is connected to the bottom portion of the cell stack 100. As shown in FIG. 2, the connection 510 is formed at one end portion of the in-vehicle bracket 500.

The fixation portion 520 secures the support bracket 600. The fixation portion 520 is formed at the in-vehicle bracket 500, apart from the connection 510. The fixation portion 520 is formed below the mounting piece 330.

The support bracket 600 supports the equipment case 300. The support bracket 600 couples the in-vehicle bracket 500 and the equipment case 300.

Specifically, the support bracket 600 couples the fixation portion 520 of the in-vehicle bracket 500 and the mounting piece 330. The support bracket 600 is disposed vertically below the service plug 420.

As described above, with the equipment component fixation structure according to the present embodiment, since the equipment case 300 is secured to the side portion 110 of the cell stack 100 and supported by the support bracket 600, the resonation of the equipment case 300 to the vibration of the vehicle, etc., is suppressed. Thus, the vibration of the equipment component 400 held in the equipment case 300 is suppressed.

Those skilled in the art will understand that the exemplary embodiment described above is a specific example of the aspect below.

The equipment component fixation structure according to the above embodiment includes: a cell stack having a side portion; an equipment case which is secured to the side portion of the cell stack and capable of holding an equipment component; the equipment component held in the equipment case; an in-vehicle bracket for mounting the cell stack onto a vehicle, the in-vehicle bracket being secured to the cell stack; and a support bracket for supporting the equipment case, wherein the in-vehicle bracket has a shape as projecting from the cell stack to below the equipment case, and the support bracket couples the in-vehicle bracket and the equipment case.

With the equipment component fixation structure, since the equipment case is secured to the side portion of the cell stack and supported by the support bracket, the resonation of the equipment case to the vibration of the vehicle, etc. is suppressed. Thus, the vibration of the equipment component held in the equipment case is suppressed.

Preferably, the equipment case has a holding portion holding a portion of the equipment component, and a mounting piece formed vertically below the holding portion, and the support bracket couples the in-vehicle bracket and the mounting piece.

In this way, the support bracket supports the equipment case vertically below the portion of the equipment component, and the vibrations of the equipment case and the equipment component are thus suppressed more reliably.

The equipment component may include a service plug as the portion of the equipment component, and a junction box.

In this case, preferably, the equipment case has an enclosing portion enclosing the junction box, the enclosing portion has the holding portion, and the mounting piece is connected to the enclosing portion.

Preferably, the equipment case further has a mounting portion connected to the enclosing portion and mounted on the side portion of the cell stack.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An equipment component fixation structure, comprising:
   a cell stack having a side portion;
   an equipment case which is secured to the side portion of the cell stack and configured to hold an equipment component;
   a cover that covers the cell stack and the equipment case;
   the equipment component held in the equipment case, wherein the equipment component includes a service plug and a junction box;
   an in-vehicle bracket for mounting the cell stack onto a vehicle, the in-vehicle bracket being secured to the cell stack; and
   a support bracket for supporting the equipment case, wherein
   the in-vehicle bracket has a shape as projecting from the cell stack to below the equipment case,
   the equipment case includes:
   an enclosing portion enclosing the junction box, and
   a mounting piece connected to a bottom end of the enclosing portion,
   the enclosing portion has a holding portion holding the service plug,
   the holding portion includes a recess formed at a top end portion of the enclosing portion,
   the mounting piece is formed vertically below the holding portion,
   the in-vehicle bracket includes:
   a connection connected to a bottom portion of the cell stack, and
   a fixation portion extending from the connection to below the mounting piece, and
   the support bracket couples the fixation portion of the in-vehicle bracket to the mounting piece of the equipment case, wherein the equipment case further includes a mounting portion that mounts the enclosing portion of the equipment case to the side portion of the cell stack, wherein:
   the enclosing portion includes a first wall, a second wall, and a third wall that couples the first wall and the second wall,
   the mounting portion includes a plurality of mounting portions respectively provided at each of the first wall and the second wall,
   the holding portion is provided at the second wall of the enclosing portion, the support bracket is formed in a plate shape and bolted to the mounting piece,
   each of the first wall and the second wall is formed in a plate shape,
   the first wall and the second wall are opposing each other,
   the recess of the holding portion is formed at the top end portion of the second wall,
   a part of the service plug protrudes from the second wall in a direction away from the first wall, and
   the service plug is exposed from the cover in a direction away from the first wall.

* * * * *